(12) United States Patent
Xu et al.

(10) Patent No.: US 10,346,989 B2
(45) Date of Patent: Jul. 9, 2019

(54) METHOD AND SYSTEM FOR CALCULATING A DISPLACEMENT OF AN OBJECT OF INTEREST

(71) Applicant: KONINKLIJKE PHILIPS N.V., Eindhoven (NL)

(72) Inventors: Jingping Xu, Eindhoven (NL); Kongkuo Lu, Eindhoven (NL); William Tao Shi, Eindhoven (NL); Christopher Stephen Hall, Bothell, WA (US)

(73) Assignee: Koninklijke Philips N.V., Eindhoven (NL)

( * ) Notice: Subject to any disclaimer, the term of this patent is extended or adjusted under 35 U.S.C. 154(b) by 60 days.

(21) Appl. No.: 15/535,763

(22) PCT Filed: Dec. 11, 2015

(86) PCT No.: PCT/EP2015/079359
§ 371 (c)(1),
(2) Date: Jun. 14, 2017

(87) PCT Pub. No.: WO2016/096635
PCT Pub. Date: Jun. 23, 2016

(65) Prior Publication Data
US 2017/0345158 A1 Nov. 30, 2017

(30) Foreign Application Priority Data

Mar. 27, 2015 (EP) .................................... 15161267

(51) Int. Cl.
*G06T 7/38* (2017.01)
*G06T 7/20* (2017.01)
*G06T 7/246* (2017.01)

(52) U.S. Cl.
CPC ................ *G06T 7/20* (2013.01); *G06T 7/248* (2017.01); *G06T 7/38* (2017.01);
(Continued)

(58) Field of Classification Search
CPC .............. G06T 7/20; G06T 7/38; G06T 7/248
See application file for complete search history.

(56) References Cited

U.S. PATENT DOCUMENTS 6,442,476 B1 * 8/2002 Poropat ..................... G01S 5/16
701/23
6,563,964 B1 5/2003 Hallberg
(Continued)

OTHER PUBLICATIONS

Hermosillo et al "Variational Methods for Multimodal Image Matching" Int. J. Comput. Vision 50, p. 329-343 (2002).
(Continued)

*Primary Examiner* — Gregory M Desire

(57) ABSTRACT

The invention relates to a method of calculating a displacement of an object of interest comprising a step of calculating (101) a displacement model of said object of interest from adjacent images of a set of pre-acquired images of said object of interest, said displacement model reflects the position of said object of interest along the time. The method is characterized in that the method further comprises the following. A step of determining (102) a first sub-set of images (S1) from said set of pre acquired images within one periodical time cycle of said set of pre-acquired images on the basis of the displacement model. A first step of identifying (103) a second sub-set of images (S2) from newly-acquired images, wherein images in said second sub-set of images (S2) are consecutive and have the same most similar image in said first sub-set of images (S1), wherein a first set of similarity levels is determined by comparing a given image in said newly acquired images with each image of said first sub-set of images (S1), and wherein said most
(Continued)

similar image has the largest similarity level in said first set of similarity levels. A first step of selecting (104) a given image in said second sub-set of images (S2) as a first reference image (I1). A second step of identifying (105) a third sub-set of images (S3) from said newly-acquired images, wherein images in said third sub-set of images (S3) are consecutive and have the same most similar image in said first sub-set of images (S1), wherein a set of similarity levels is determined by comparing a given image in said newly acquired images with each image of said first sub-set of images (S1), and wherein said most similar image has the largest similarity level in said set of similarity levels. A second step of selecting (106) a given image in said third sub-set of images (S3) as a second reference image (I2). A step of calculating (107) the displacement between said second reference image (I2) and said first reference image (I1). The invention also relates to a corresponding system of displacement calculation.

14 Claims, 5 Drawing Sheets

(52) U.S. Cl.
CPC .............. *G06T 2207/10016* (2013.01); *G06T 2207/10132* (2013.01); *G06T 2207/20081* (2013.01); *G06T 2207/30004* (2013.01)

(56) References Cited

U.S. PATENT DOCUMENTS

| | | | |
|---|---|---|---|
| 2003/0018232 | A1 | 1/2003 | Elliott et al. |
| 2010/0172469 | A1 | 7/2010 | Poulsen et al. |
| 2012/0035462 | A1 | 2/2012 | Maurer et al. |
| 2012/0302878 | A1 | 11/2012 | Liu et al. |
| 2014/0015421 | A1 | 1/2014 | Mituyasu et al. |
| 2014/0107390 | A1 | 4/2014 | Brown et al. |
| 2014/0316247 | A1 | 10/2014 | Hwang |
| 2015/0099960 | A1* | 4/2015 | Ryu .................... A61B 8/4444 600/407 |
| 2015/0131780 | A1 | 5/2015 | Tsunoo et al. |
| 2015/0021713 | A1 | 8/2015 | Stanescu et al. |
| 2015/0279613 | A1* | 10/2015 | Ogawa .................... H01J 37/20 250/442.11 |
| 2016/0018219 | A1* | 1/2016 | Sakamoto ................ G01S 13/38 702/158 |
| 2017/0004371 | A1* | 1/2017 | Getz .................... G06K 9/3208 |
| 2017/0345158 | A1* | 11/2017 | Xu ............................ G06T 7/20 |

OTHER PUBLICATIONS

Yin et al "Mass Preserving Non-Rigid Registration of CT Lung Images Using Cubic B-Spline" Med Phys. 46 (9) p. 4213-4222 (2009).
Jung-Bae Kim et al: "Real-time moving organ tracking in ultrasounfd vifdeo based on a 3D organ model", Ultrasonics Symposium (IUS), 2012 IEEE International, IEEE,Oct. 7, 2012 (Oct. 7, 2012), pp. 2659-2662.
Valeria De Luga et al: "Speeding-up image registration for repetitive motion scenarios",Biomedical Imaging (ISBI), 2012 9th IEEE International Symposium on, IEEE,May 2, 2012 (May 2, 2012), pp. 1355-1358.
Lee Hun-Cheol et al: "Rate-driven key frame selection using temporal variation of visual content", Electronics Letters, IEE Stevenage, GB,vol. 38, No. 5,Feb. 28, 2002 (Feb. 28, 2002), pp. 217-218.
Fua P et al: "Stable Real-Time 3D Tracking Using Online and Offline Information",IEEE Transactions on Pattern Analysis and Machine Intelligence, IEEE Computer Society, USA,vol. 26, No. 10, Oct. 1, 2004 (Oct. 1, 2004), pp. 1385-1391.
J.R. McClelland, et. al, 'Respiratory motion models: A review', Medical Image Analysis, 2013, vol. 17: 19-42.
Gunti Gunarathne, Advancements and breakthroughs in ultrasound imaging, 2013, InTech, (www.intechopen.com).
Kubo H and Hill B. Ball, 'Respiration gated radiotherapy treatment: a technical study', Phys. Med. Biol., 1996, vol. 41: 83-91.
Ohara K, et. al., 'Irradiation synchronized with respiration gate', Int. J. Radiation Oncology, 1989, vol. 17:853-857.
H. Fayad, et. al., 'Technical note: correlation of respiratory motion between external patient surface and internal anatomical landmarks', J. Med. Phys, 2011, vol. 38(6): 3157-3164.
G.S. Mageras, et.al, 'Fluoroscopic evaluation of diaphragmatic motion reduction with a respiratory gated radiotherapy system', J. Appl. Clin. Med. Phys., 2001, vol. 2: 191-200.
Qianyi, Xu et. al., 'A novel respiratory detection method based on automated analysis of ultrasound diaphragm', J. Med. Phys, 2006, vol. 33(4): 916-921.
Youngkyoo Hwang, et. al., 'Ultrasound image-based respiratory motion tracking', Medical Imaging 2012: Ultrasonic Imaging, Tomography and Therapy, 2012, Proc. of SPIE, vol. 8320:83200N.
J. Wu, et. al., 'A fast and robust method to extract respiratory motion from liver ultrasound images', (http://jiaze-wu.weebly.com/uploads/1/2/2/4/12248481/jiazewu-cars2013.pdf).
J. Wu, et. al., 'Fast and robust extraction of surrogate respiratory signal from intra-operative liver ultrasound images', International Journal of Computer assisted radiology and surgery, 2013, Int J Cars DOI 10.1007/s11548-013-0902-y.
J. Zhang, et.al., 'Fast algorithm for respiratory motion correction in free-breathing contrast-enhanced ultrasound imaging', Medical Imaging: Ultrasonic Imaging, Tomography, and Therapy, 2011 (http://proceedings.spiedigitallibrary.org/proceeding.aspx?articleid=726998).
J. Zhang et. al , 'Respiratory motion correction in free-breathing ultrasound image sequence for quantification of hepatic perfusion', Medical Physics, 2011, vol. 38(8):4737-4748.
Pysz. MA et. al , 'Quantitative assessment of tumor angiogenesis using real-time motion-compensated contrast-enhanced ultrasound imaging', Angiogenesis, 2012, vol. 15(3):433-442.
C. Grouls et. al , 'Development and validation of an intrinsic landmark-based gating protocol applicable for functional and molecular ultrasound imaging', European Radiology, 2012, vol. 22(8):1789-1796.
M. Rubin et. al , 'Potential use of ultrasound speckle tracking for motion management during radiotherapy: Preliminary report', J Ultrasound Med, 2012, vol. 31:469-481.
M.A.L Bell et. al , 'In vivo liver tracking with a high volume rate 4D ultrasound scanner and 2 2D matrix array probe', Phys. Med. Biol., 2012, vol. 57:1359-1374.
J.P Xu et. al , Quantification approaches in ultrasound contrast imaging literature review: techniques, clinical applications and competitor analysis, Technical Note PR-TN 2012/00665; (Nov. 2012).

\* cited by examiner

METHOD AND SYSTEM FOR CALCULATING A DISPLACEMENT OF AN OBJECT OF INTEREST

This application is the U.S. National Phase application under 35 U.S.C. § 371 of International Application No. PCT/EP2015/079359, filed on Dec. 11, 2015, which claims the benefit of International Application PCT/CN2014/094132 filed Dec. 17, 2014 and EP Application Serial No. 15161267.8 filed Mar. 27, 2017. These applications are hereby incorporated by reference herein.

FIELD OF THE INVENTION

The invention relates to the field of object movement measurement, in particular to a method for calculating displacement of an object of interest.

BACKGROUND OF THE INVENTION

Radiation therapy is widely used in cancer treatment or therapy. The purpose of radiation therapy is to kill the pathology occurring in an object of interest in a patient body, for example, tumor cells, without damaging the surrounding tissue of the object of interest. This is done by delivering a higher radiation dose to the object of interest of the patient body and a possibly lower radiation dose to healthy organ tissues surrounding the object of interest. However, during the whole treatment process, respiratory motion of the patient body may produce inaccuracy on the position where radiation is applied. Indeed, the position of the object of interest of the patient body may change with the respiratory motion, and even the size and shape of the object of interest of patient body sometimes change with deformation by internal body muscles forces.

Object tracking is a challenge when the object of interest is in the patient body due to body movement, such as body movement caused by respiration. Difficulties in tracking the movement of such an object of interest in the patient body caused by respiration may be an important cause of inaccuracy when the radiation therapy is conducted.

Ultrasound imaging is used to provide images during treatment. A known approach for motion tracking is that markers are put on the skin of the patient. The markers are then tracked using an imaging device such as ultrasound. However, dealing with a large set of images is a challenge in object tracking. Currently, there is no solution available yet for tracking the position of an object in the patient body, because of the high computation complexity needed. Measuring the corresponding surface movement is also not accurate enough to reflect the object movement in the body.

The publication, speeding-up image registration for repetitive motion scenarios, ISBI (1355-1358), disclosed a method for real-time image registration for image sequences of organs subject to breathing. During training phase, the images are registered and then the relationship between the image appearance and the spatial transformation is learned by employing dimensionality reduction to the images and storage of the corresponding displacements. For each image in the application phase, the most similar images in the training set are calculated and a displacement prediction is conducted. The publication, respiration induced fiducial motion tracking in ultrasound using an extended SFA approach, Proc. Of SPIE Vol. 9419, disclosed a method for transferring the pre-estimated target motion extracted from ultrasound image sequences in training stage to online data in real-time. The method is based on extracting feature points of the target object, exploiting low-dimensional description of the feature motion through slow feature analysis, and finding the most similar image frame from training data for estimating current or online object location. For each acquired image, the most similar image is calculated and then a mapping is conducted based on the most similar image for each acquired image. Therefore, the computation complexity is high.

OBJECT AND SUMMARY OF THE INVENTION

It is an object of the invention to propose a method of calculating a displacement of an object of interest.

The invention is defined by the independent claims. The dependent claims define advantageous embodiments.

The method according to the invention aims to calculate a displacement of an object of interest. The method comprises a step of calculating a displacement model of the object of interest from adjacent images of a set of pre-acquired images of the object of interest, the displacement model reflects the position of the object of interest along the time. The method further comprises:

a step of determining a first sub-set of images from the set of pre-acquired images within one periodical time cycle of the set of pre-acquired images on the basis of the displacement model;

a first step of identifying a second sub-set of images from newly-acquired images, images in the second sub-set of images (S2) are consecutive and have the same most similar image in the first sub-set of images (S1), wherein a set of similarity levels is determined by comparing a given image in the newly acquired images with each image of the first sub-set of images (S1), and wherein the most similar image has the largest similarity level in the set of similarity levels;

a first step of selecting a given image in the second sub-set of images as a first reference image;

a second step of identifying a third sub-set of images from the newly-acquired images, wherein images in the third sub-set of images (S3) are consecutive and have the same most similar image in the first sub-set of images (S1), wherein a set of similarity levels is determined by comparing a given image in the newly acquired images with each image of the first sub-set of images (S1), and wherein the most similar image has the largest similarity level in the set of similarity levels;

a second step of selecting a given image in the third sub-set of images as a second reference image;

a step of calculating the displacement between the second reference image and the first reference image.

With this method, a displacement caused by the movement of the object of interest can be calculated with limited computation resources. Indeed, this method reduces computation complexity which leads to a practical solution of tracking position of the object of interest while image acquisition is being taken. It also improves the accuracy of detecting position change of the object in the body.

By using this method, the displacement calculation is based on selected images from two consecutive sub-sets of the newly acquired images. It reduces the computation complexity comparing to calculating the displacement between two consecutive newly acquired images.

The invention also relates to a system for calculating a displacement.

The system comprises a processing unit for carrying out the various steps of the above mentioned method according to the invention.

Detailed explanations and other aspects of the invention will be given below.

BRIEF DESCRIPTION OF THE DRAWINGS

Particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 1:
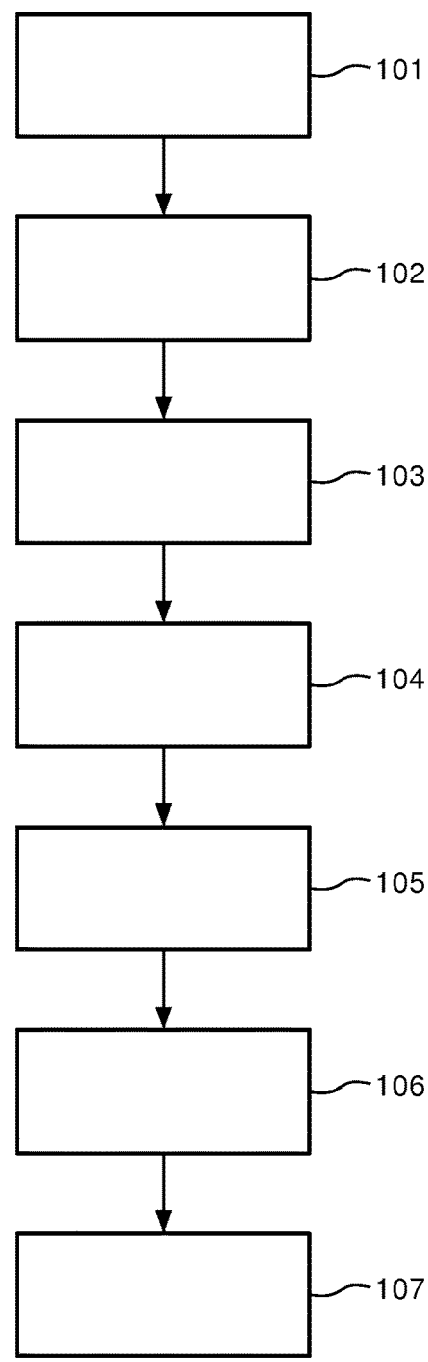
FIG. 1 depicts a flow chart of a method in accordance with the present invention.

Radiation therapy is a treatment widely used in cancer treatment or more generally in medical therapy, for example. Radiation therapy aims to kill tumor cells in a patient body without damaging the surrounding tissue, by delivering a higher radiation dose to the tumor and a possibly radiation lower dose to healthy organ tissues. In the following, the part of the patient body which receives the radiation is described as "object of interest". For example, during the treatment for tumor in abdomen, the object of interest may have a certain movement caused by respiration of the patient. By calculating the displacement caused by this movement, the displacement information is sent to a control module of the radiation therapy equipment used for the treatment. The control module uses this displacement information for compensating the displacement of the object of interest of the patient body, in order for the radiation beam to follow the object of interest, even if the object of interest has a certain movement.

Before the start of the treatment, an object of interest of a patient body is scanned with a medical imaging system to acquire images, for example, ultrasound imaging, X-ray, CT and MRI, etc. For example, the scan is done a few hours or minutes before the treatment.

During the scan, the patient lies horizontally, for example, on a bed. The duration of the image scanning is equivalent to the duration of several respiratory cycles of the patient. These images generated by the medical imaging system are called "pre-acquired images" in the present invention. Images obtained during image scanning allow to derive a displacement model of the object of interest along the time.

According to a first approach, the displacement model is obtained by successively calculating the displacement of the object of interest between two consecutive pre-acquired images. By doing this over time, the whole patient displacement model of the object of interest of the patient body can be measured.

According to a second approach, the displacement model is obtained by using markers attached on the patient skin during the scan. Based on the position information of the markers provided to some sensors, the displacement information of the object of interest can be calculated. Therefore, the whole patient displacement model of the object of interest of the patient body can be measured by doing this along the time.

During treatment, a radiation beam is directed to the object of interest of the patient body. The patient is scanned with a medical imaging system for acquiring images, for example, ultrasound imaging. The scan will last for the whole duration of the treatment. These images generated by the medical imaging system are called "newly-acquired images" in the present invention.

According to the invention, the displacement information of the object of interest of the patient body is calculated based on the newly-acquired images, while the patient is being scanned with a medical imaging system during the treatment, as detailed in the following.

FIG. 1 depicts a flow chart of a method in accordance with the present invention, for calculating a displacement of an object of interest.

The method comprises a step of calculating 101 a displacement model of the object of interest from adjacent images of a set of pre-acquired images of the object of interest, wherein the displacement model reflects the position of the object of interest along the time. The displacement model can, for example, be determined by the first or second above-mentioned approaches.

The object of interest may comprise various types of objects, wherein the position information needs to be determined. For example, in the field of radiation therapy, the object of interest corresponds to a tissue or organ in the patient body. The object of interest may be a phantom which is interested to be monitored in the field of industry.

Figure 2:
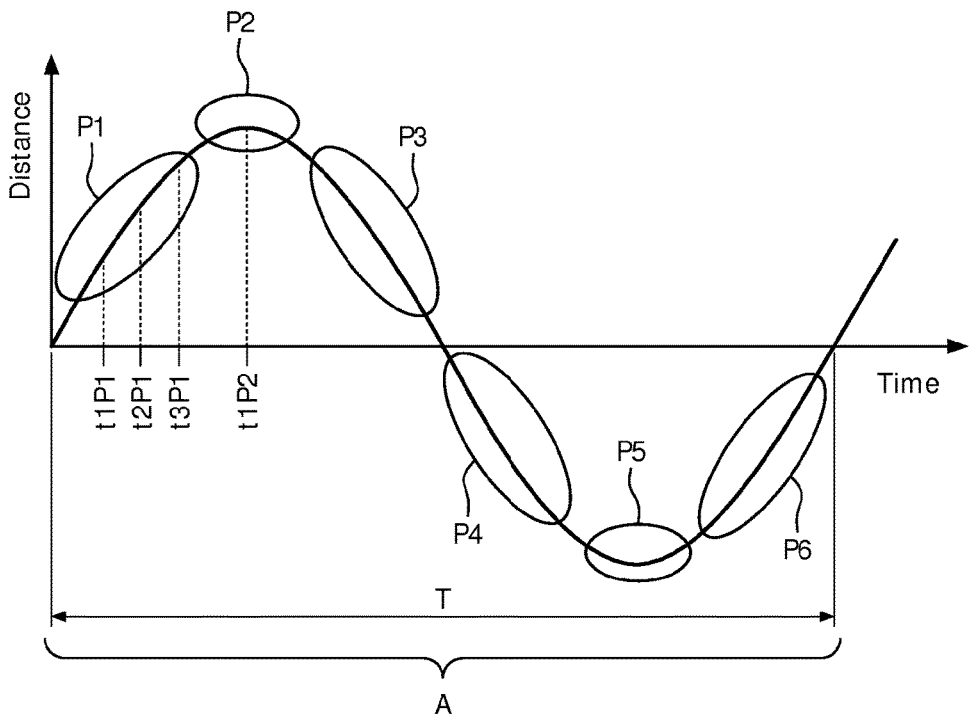
FIG. 2 illustrates an example of a displacement model of an object of interest in accordance with the present invention.

FIG. 2 depicts an example of a displacement model of an object of interest in accordance with the present invention.

The horizontal axis corresponds to the time and the vertical axis corresponds to the displacement of the object of interest. The displacement model reflects the position of an object of interest varying along the time, of a patient body, for example. For the object of interest in the patient body, the displacement model is typically a periodical curve because the movement is caused by respiratory movement. One periodical time cycle is T. For example, section A is one period of the displacement model. P1, P3, P4 and P6 represent regions where the displacement changes are faster compared to regions P2 and P5 where the displacement changes are slower.

The method also comprises a step of determining 102 a first sub-set of images S1 from the set of pre-acquired images within one periodical time cycle of the set of pre-acquired images on the basis of the displacement model.

Time points within one period of the displacement model are selected. As illustrated in FIG. 2, some time points are selected in section A. There are some regions, for example, P1, P2, P3, P4, P5 and P6.

In FIG. 2, t1P1, t2P1, t3P1 are selected time points in the region P1, while t2P2 is a selected time point in the region P2. There should be some other time points selected in other regions, for example, in P3, P4, P5 and P6.

Images acquired at these selected time points form a set of images called "the first sub-set of images" in the following.

Figure 3:
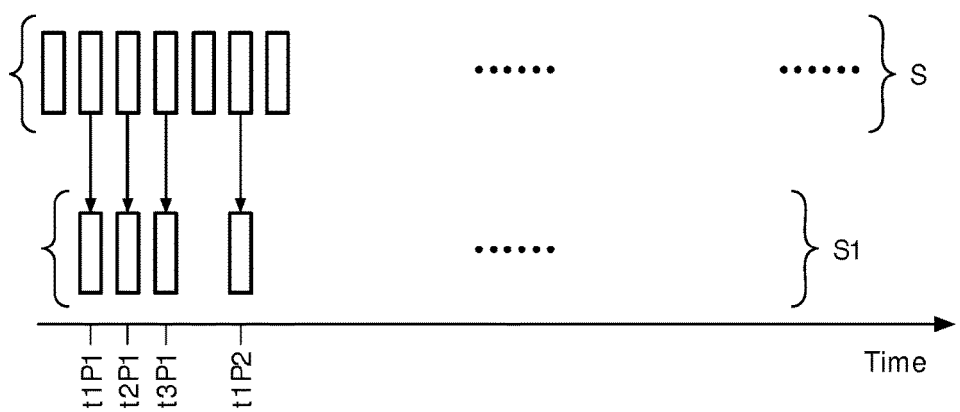
FIG. 3 illustrates the relationship of a first sub-set of images and pre-acquired images in accordance with the present invention.

FIG. 3 illustrates the relationship between the first sub-set of images S1 and the pre-acquired images S. The first sub-set of images S1 is a sub-set of the pre-acquired images S.

As illustrated, images in the pre-acquired images S where no time points have been chosen are not included in the first sub-set of images S1.

The method also comprises a first step of identifying 103 a second sub-set of images S2 from newly-acquired images, wherein images in the second sub-set of images (S2) are consecutive and have the same most similar image in the first sub-set of images (S1), wherein a set of similarity levels is determined by comparing a given image in the newly acquired images with each image of the first sub-set of images (S1), and wherein the most similar image has the largest similarity level in the set of similarity levels.

The newly acquired images are images acquired during the treatment of the patient. The most similar image is a representative image in the first sub-set of images S1 for a newly acquired image.

For a newly acquired image, by comparing with an image in the first sub-set of images S1, a similarity level is derived. By comparing with all images in the first sub-set of images S1, a set of similarity levels is derived. Each similarity level represents the similarity between the newly acquired image and the corresponding image in the first sub-set of images S1. The most similar image is selected from the first sub-set of images S1. The similarity level between the most similar image and the newly acquired image is the largest in the set of similarity levels.

Figure 4:
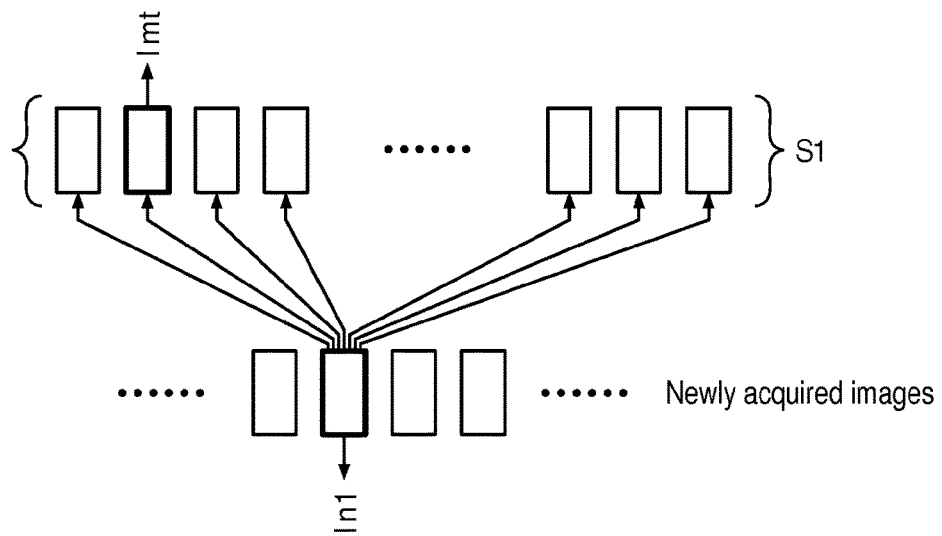
FIG. 4 illustrates identification of similarity for a newly acquired image in accordance with the present invention.

For example, in FIG. 4, image In1 is a newly acquired image. This newly acquired image In1 is compared with all the images in the first sub-set of images S1. A set of similarity level is derived by comparing the newly acquired image In1 and all the images in the first sub-set of images S1. Image Imt has the largest similarity level among the first sub-set of images S1. Then, image Imt is identified as the most similar image of the newly acquired image In1 in S1.

For each newly acquired image, a most similar image is identified in the same way.

It may happen that some newly acquired images have the same most similar image in the first sub-set of images S1.

The acquisition frame rate along the time of the first sub-set of images S1 is lower than the pre-acquired images. The acquisition frame rate of the pre-acquired images is the same as the acquisition frame rate of the newly acquired images for the same object of interest of the patient body. Therefore, the acquisition frame rate of the first sub-set of images S1 is lower than the newly acquired images. For example, in 3-dimensional volumetric ultrasound imaging, the image acquisition frame rate is in the range [4 Hz-15 Hz] if using ultrasound probe with mechanically swept linear array and [20 Hz-50 Hz] if using ultrasound probe with electrically steering matrix array transducers.

In the following, "3D" is used to represent 3-dimensional; "2D" is used to represent 2-dimensional.

Figure 5:
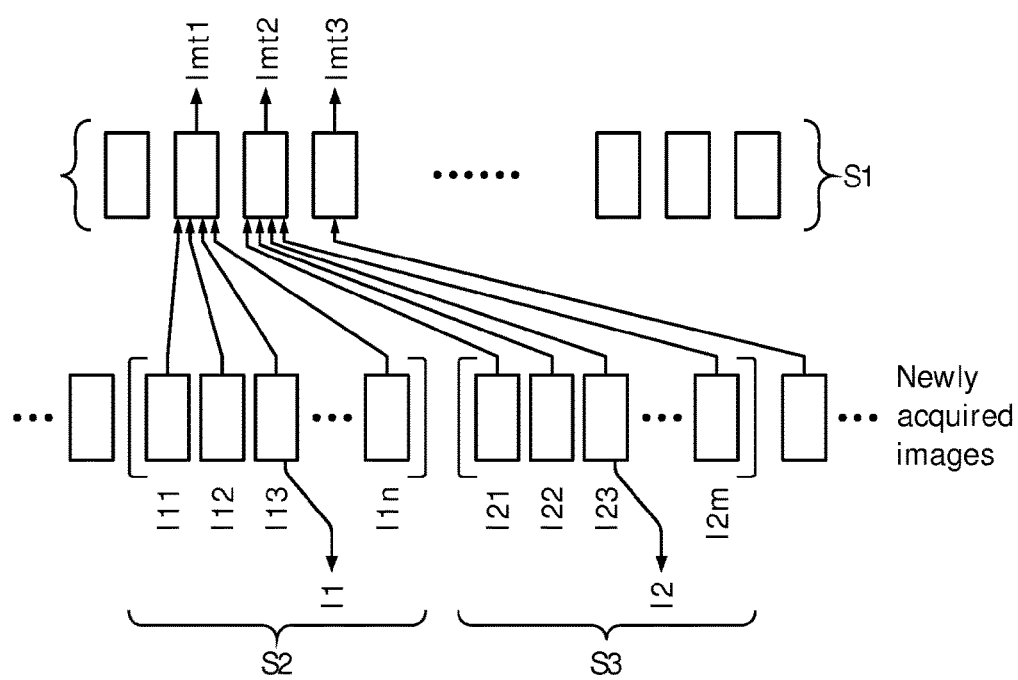
FIG. 5 illustrates selection of a first reference image and a second reference image in accordance with the present invention.

For example, as illustrated in FIG. 5, the newly acquired images from images [I11 ... I1n] have the same most similar image Imt1 in the first sub-set of images S1. Therefore, the set of images [I11 ... I1n] defines the second sub-set of images, referred to as S2 in FIG. 5.

The second sub-set of images S2 is fully identified when the most similar image in the first sub-set of images S1 of a newly acquired image is different than image Imt1. For example, when Tmt2 is identified as the most similar image in the first sub-set of images S1 of a newly acquired image I21, the second sub-set of images S2 is completed.

The method also comprises a first step of selecting 104 a given image I1 in the second sub-set of images S2 as a first reference image I1;

As shown in FIG. 5, image I1 is selected from the second sub-set of images S2 to be the first reference image.

Advantageously, the first reference image I1 is an image chosen in a central time slot of the second sub-set of images S2. For example, if the number of the second sub-set of images S2 is n, if n is an odd number, the order of the first reference image I1 is chosen to be (n+1)/2 in the second sub-set of images S2; if n is an even number, the order of the first reference image I1 is chosen to be n/2−1 or n/2+1 in the second sub-set of images S2.

Advantageously, the first reference image I1 is an image randomly or arbitrarily chosen in the second sub-set of images S2.

Advantageously, the first reference image I1 is the first image in the second sub-set of images S2.

The method also comprises a second step of identifying 105 a third sub-set of images S3 from the newly-acquired images, wherein images in the third sub-set of images (S3) are consecutive and have the same most similar image in the first sub-set of images (S1), wherein a set of similarity levels is determined by comparing a given image in the newly acquired images with each image of the first sub-set of images (S1), and wherein the most similar image has the largest similarity level in the set of similarity levels.

The newly acquired images are images acquired during the treatment of the patient.

The most similar image is a representative image in the first sub-set of images S1 for a newly acquired image.

For a newly acquired image, by comparing with an image in the first sub-set of images S1, a similarity level is derived. By comparing with all images in the first sub-set of images S1, a set of similarity levels is derived. Each similarity level represents the similarity between the newly acquired image and the corresponding image in the first sub-set of images S1. The most similar image is selected from the first sub-set of images S1. The similarity level between the most similar image and the newly acquired image is the largest in the set of similarity levels.

For example, in FIG. 5, image I21 is a newly acquired image. This newly acquired image I21 is compared with all the images in the first sub-set of images S1. A set of similarity level is derived by comparing the newly acquired image I21 and all the images in the first sub-set of images S1. Image Imt2 has the largest similarity level among the first sub-set of images S1. Then, image Imt2 is identified as the most similar image of the newly acquired image I21 in S1.

For each newly acquired image, a most similar image is identified in the same way.

It may happen that some newly acquired images have the same most similar image in the first sub-set of images S1.

The acquisition frame rate along the time of the first sub-set of images S1 is lower than the pre-acquired images. The acquisition frame rate of the pre-acquired images is the same as the acquisition frame rate of the newly acquired images for the same object of interest of the patient body. Therefore, the acquisition frame rate of the first sub-set of images S1 is lower than the newly acquired images. For example, in 3D volumetric ultrasound imaging, the image acquisition frame rate is in the range [4 Hz-15 Hz] if using ultrasound probe with mechanically swept linear array and [20 Hz-50 Hz] if using ultrasound probe with electrically steering matrix array transducers.

For example, as illustrated in FIG. 5, the newly acquired images from images [I21 . . . I2m] have the same most similar image Imt2 in the first sub-set of images S1. Therefore, the set of images [I21 . . . I2m] defines the third sub-set of images, referred to as S3 in FIG. 5.

The third sub-set of images S3 is fully identified when the most similar image in the first sub-set of images S1 of a newly acquired image is different than image Imt2. For example, when Imt3 is identified as the most similar image in the first sub-set of images S1 of a newly acquired image I31, the third sub-set of images S3 is completed.

The method also comprises a second step of selecting 106 a given image I2 in the third sub-set of images S3 as a second reference image I2;

As shown in FIG. 5, image I2 is selected from the third sub-set of images S3 to be the second reference image.

Advantageously, the second reference image I2 is an image chosen to be in a central time slot of the third sub-set of images S3. For example, if the number of the third sub-set of images S3 is n, if n is an odd number, the order of the second reference image I2 is chosen to be (n+1)/2 in the third sub-set of images S3; if n is an even number, the order of the second reference image I2 is chosen to be n/2−1 or n/2+1 in the third sub-set of images S3.

Advantageously, the second reference image I2 is an image randomly or arbitrarily chosen in the third sub-set of images S3.

Advantageously, the second reference image I2 is the first image in the third sub-set of images S3.

The method also comprises a step of calculating 107 the displacement of the object of interest between the second reference image I2 and the first reference image I1.

The displacement represents the position change between the position of the object in the second reference image I2 and the position of the object in the first reference image I1.

The displacement is measured by calculating the distance between position information of the object of interest of the patient body on image I2 and position information of the object of interest of the patient body on image I1.

For example, in ultrasound imaging, the displacement between two images is calculated by using the method in the present invention. In 2D ultrasound imaging, it is calculated on 2 directions of coordinate axes (x, y) respectively. In 3D ultrasound imaging, it is calculated on 3 directions of coordinate axes (x, y, z) respectively.

The displacement calculated above reflects the pixels shifted. By combing with the known spatial resolution on each direction of the coordinate axes, the actual movement distance is determined.

Advantageously, the step of determining 102 is adapted to determining the first sub-set of images S1 having a number of images chosen in the set [12, 14, 16, 18, 20, 22, 24].

For example, if a patient respiration frequency is around 20/min and the duration of a respiration cycle of the patient is around 3 seconds. In 3D volumetric ultrasound imaging, if the image acquisition frame rate is in the range [4 Hz-15 Hz] if using ultrasound probe with a mechanically swept linear array and [20 Hz-50 Hz] if using ultrasound probe with an electrically steering matrix array transducer. Therefore, the number of ultrasound images which can be acquired within one respiration periodical time cycle is in the range [12; 45] if using ultrasound probe with a mechanically swept linear array and [60; 150] if using ultrasound probe with an electrically steering matrix array transducer.

As an example, experiments show that the number of images chosen from the set [12, 14, 16, 18, 20, 22, 24] is realistic.

Advantageously, the step of determining 102 comprises selecting a first region and a second region within a periodical time cycle of the displacement model, wherein the number of images selected in the first region is larger than the number of images selected in the second region, and wherein the slope of the displacement model within the first region is larger than the slope of the displacement model within the second region.

As illustrated in FIG. 2, some regions are selected, for example, P1, P2, P3, P4, P5 and P6. The slope of the displacement model indicates the displacement change. The slope of the region P1 and the slope of the region P3 are larger than the slope of the region P2. The slope of the region P4 and the slope of the region P6 are larger than the slope of the region P5.

For example, t1P1, t2P1, t3P1 are selected time points in the region P1, while t2P2 is the selected time point in the region P2. The number of time points selected in the region P1 is larger than the number of time points selected in the region P2. Meanwhile, the slope of the region P1 is larger than the slope of the region P2.

There should be some other time points selected in other regions, for example, P3, P4, P5 and P6. The number of time points selected in the region P3 is larger than the number of time points selected in the region P2. Meanwhile, the slope of the region P3 is larger than the slope of the region P2. The number of time points selected in the region P4, P6 is larger than the number of time points selected in the region P5. Meanwhile, the slope of the region P4, P6 is larger than the slope of the region P5.

Advantageously, after the above step of determining 102, the method further comprises a step of attaching indicators to the first sub-set of image S1, the indicators comprising respiratory expiration information and respiratory inspiration information of the object of interest.

For example, a respiratory time cycle of the patient comprises expiration stage and inspiration stage. Each image in the first sub-set of image S1 is given an indicator to reflect different status.

Advantageously, the most similar image in the first step of identifying 103 and in the second step of identifying 105 is identified based on using criteria chosen among volume-to-volume cross-correlation criteria and minim of sum of square difference criteria.

Volume-to-volume cross correlation is a known image processing method (Hermosillo, G., Chefd'Hotel, D., Faugeras, O.: Variational methods for multimodal image matching. Int. J. Comput. Vision 50, 329-343 (2002)). Applying volume-to-volume cross-correlation is to find the maximum correlation coefficient between the given image and images in the first sub-set of images S1.

Minim of sum of square difference criteria is also a known image processing method (Yin, Y., Hoffman, E., Lin, C.: Mass preserving nonrigid registration of CT lung images using cubic B-spline. Med. Phys. 36(9), 4213-4222(2009)).

Advantageously, the first step of identifying 103 comprises the sub-steps of:

attaching an indicator to a newly acquired image based on comparing with the consecutive image, the indicator comprising respiratory expiration information and respiratory inspiration information;

identifying a fourth sub-set of images S4 from the first sub-set of images S1, the fourth sub-set of images S4 having the same indicator;

identifying the second sub-set of images S2 from newly acquired images, images in the second sub-set of images S2 having the same most similar image in the fourth sub-set of images S4.

The indicators comprise respiratory expiration information and respiratory inspiration information of the object of interest as mentioned above.

Advantageously, the second step of identifying 105 comprises the sub-steps of:

attaching an indicator to a newly acquired image based on comparing with the adjacent image, the indicator comprising respiratory expiration information and respiratory inspiration information;

identifying a fourth sub-set of images S4 from the first sub-set of images S1, wherein the fourth sub-set of images S4 having the same indicator;

identifying the third sub-set of images S3 from newly acquired images, wherein images in the third sub-set of images S3 having the same most similar image in the fourth sub-set of images S4.

The indicators comprise respiratory expiration information and respiratory inspiration information of the object of interest as mentioned above.

Advantageously, the method further comprises the following:

a sub-step of compensating 108, based on the displacement, the position of a radiation beam intended to be directed to the object of interest.

The radiation beam direction is adjusted accordingly in order to follow the movement of the object of interest. Therefore, the patient body respiratory movement is compensated.

Figure 6:
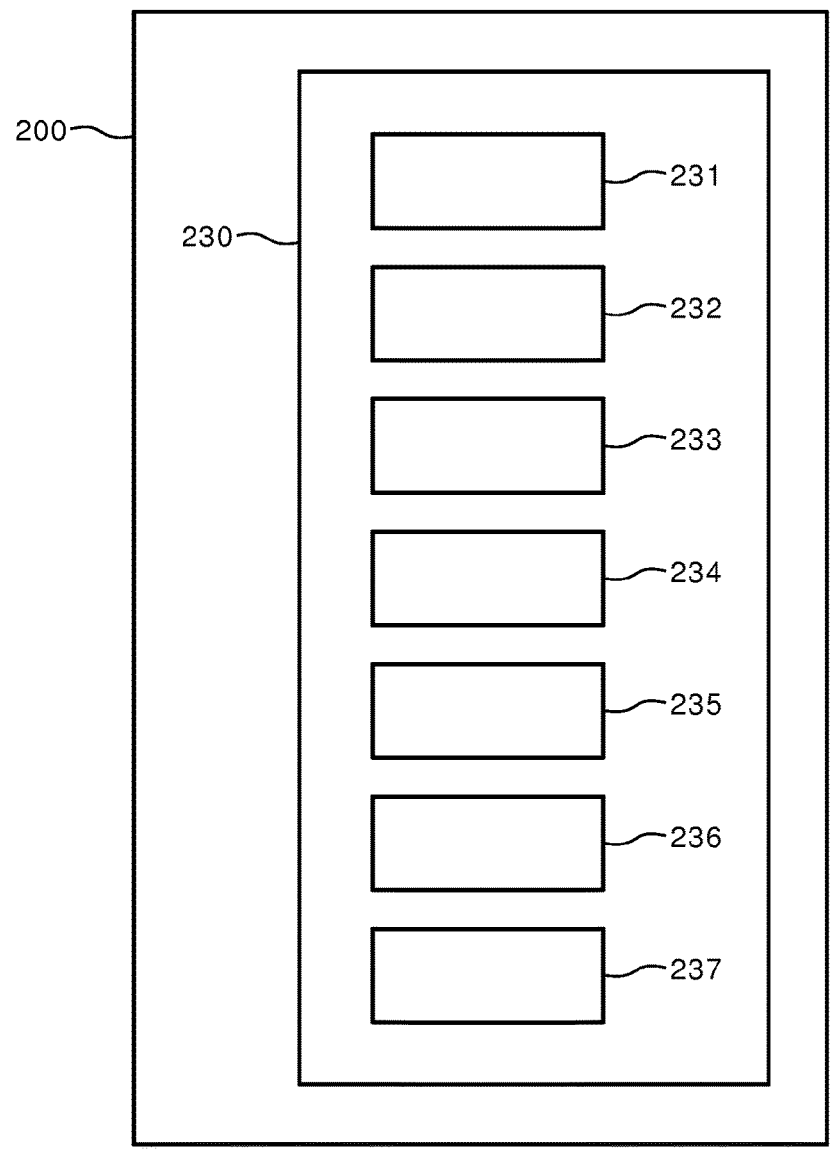
FIG. 6 depicts a schematic diagram of a system in accordance with the present invention.

FIG. 6 depicts a schematic diagram of a system 200 in accordance with an embodiment of the present invention to calculate a displacement. The system 200 comprises a processing unit 230 for:

a first unit (231) for calculating a displacement model of the object of interest from adjacent images of a set of pre-acquired images of the object of interest, wherein the displacement model reflects the position of the object of interest along the time;

a second unit (232) for determining a first sub-set of images S1 from the set of pre-acquired images within one periodical time cycle of the set of pre-acquired images;

a third unit (233) for identifying a second sub-set of images S2 from newly-acquired images, wherein images in the second sub-set of images (S2) have the same most similar image in the first sub-set of images (S1), wherein a set of similarity levels is determined by comparing a given image in the newly acquired images with each image of the first sub-set of images (S1), and wherein the most similar image has the largest similarity level in the set of similarity levels;

a fourth unit (234) for selecting a given image in the second sub-set of images S2 as a first reference image I1;

a fifth unit (235) for identifying a third sub-set of images S3 from the newly-acquired images, wherein images in the third sub-set of images (S3) have the same most similar image in the first sub-set of images (S1), wherein a set of similarity levels is determined by comparing a given image in the newly acquired images with each image of the first sub-set of images (S1), and wherein the most similar image has the largest similarity level in the set of similarity levels;

a sixth unit (236) for selecting a given image in the third sub-set of images S3 as a second reference image I2;

a seventh unit (237) for calculating the displacement between the second reference image I2 and the first reference image I1.

The various units of the system according to the invention are adapted to carry out the various steps described previously. For example, one or a plurality of units is implemented in one or a plurality of processors.

Figure 7:
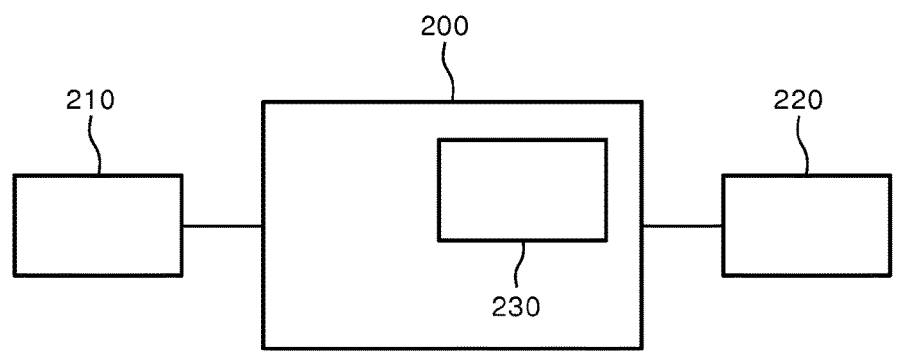
FIG. 7 depicts a schematic diagram of a system in accordance with the present invention.

FIG. 7 depicts a system in accordance with an embodiment of the present invention.

Advantageously, the system 200 is adapted to connect to an image acquisition module 210.

This image acquisition module 210 aims at acquiring pre-acquired images and newly acquired images.

Advantageously, the system 200 is adapted to connect to a control module 220.

The displacement calculated by the processing unit 230 is delivered by the calculating the processing unit 230 and sent to the control module 220. The control module 220 is activated to deliver the radiation beam in order to follow the movement of the object of interest.

Advantageously, the image acquisition module 210 is an ultrasound imaging acquisition module.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A method of calculating a displacement of an object of interest, comprising a step of calculating, with a processor, a displacement model of said object of interest from adjacent images of a set of pre-acquired images of said object of interest, said displacement model being periodical and reflecting the position of said object of interest along the time, characterize in that said method further comprising:

a step of determining, with the processor, a first sub-set of images from said set of pre-acquired images within one periodical time cycle of said set of pre-acquired images on the basis of the displacement model;

a first step of identifying, with the processor, a second sub-set of images from newly-acquired images, wherein images in said second sub-set of images are consecutive and have the same most similar image in said first sub-set of images, wherein a set of similarity levels is determined by comparing a given image in said newly acquired images with each image of said first sub-set of images, and wherein said most similar image has the largest similarity level in said set of similarity levels;

a first step of selecting, with the processor, a given image in said second sub-set of images as a first reference image;

a second step of identifying, with the processor, a third sub-set of images from said newly-acquired images, wherein images in said third sub-set of images are consecutive and have the same most similar image in said first sub-set of images, wherein a set of similarity levels is determined by comparing a given image in said newly acquired images with each image of said first sub-set of images, wherein said most similar image has the largest similarity level in said set of similarity levels, and wherein the same most similar image which the images in the third sub-set of images have is different from the same most similar image which the images in the second sub-set of images have;

a second step of selecting with the processor, a given image in said third sub-set of images as a second reference image;

a step of calculating, with the processor, the displacement between said second reference image and said first reference image.

2. A method as claimed in claim 1, wherein said step of determining is adapted to determining said first sub-set of images having a number of images chosen in the set.

3. A method as claimed in claim 1, wherein said step of determining comprises selecting a first region and a second region within a periodical time cycle of said displacement model, wherein the number of images selected in said first region is larger than the number of images selected in said second region, and wherein the slope of said displacement model within said first region is larger than the slope of said displacement model within said second region.

4. A method as claimed in claim 1, wherein after said step of determining, further comprising a step of attaching indicators to said first sub-set of image, said indicators comprising respiratory expiration information and respiratory inspiration information of said object of interest.

5. A method as claimed in claim 4, wherein said first step of identifying comprises the sub-steps of:

attaching an indicator to a newly acquired image based on comparing with the consecutive image, wherein said indicator comprising respiratory expiration information and respiratory inspiration information;

identifying a fourth sub-set of images from said first sub-set of images, wherein said fourth sub-set of images have the same indicator;

identifying said second sub-set of images from newly acquired images, wherein images in said second sub-set of images have the same most similar image in said fourth sub-set of images.

6. A method as claimed in claim 4, wherein said second step of identifying comprises the sub-steps of:

attaching an indicator to a newly acquired image based on comparing with the adjacent image, wherein said indicator comprising respiratory expiration information and respiratory inspiration information;

identifying a fourth sub-set of images from said first sub-set of images, wherein said fourth sub-set of images have the same indicator;

identifying said third sub-set of images from newly acquired images, wherein images in said third sub-set of images have the same most similar image in said fourth sub-set of images.

7. A method as claimed in claim 1, wherein the most similar image in said first step of identifying and in said second step of identifying is identified based on using criteria chosen among volume-to-volume cross-correlation criteria and minim of sum of square difference criteria.

8. A method as claimed in claim 1, wherein said first step of selecting comprises selecting said first reference image in a central time slot of said newly acquired images.

9. A method as claimed in claim 1, wherein said second step of selecting comprises selecting said second reference image in a central time slot of said newly acquired images.

10. A method as claimed in claim 1, further comprising:

a sub-step of compensating, based on said displacement, the position of a radiation beam intended to be directed to said object of interest.

11. A system for calculating a displacement, said system comprising a processor configured to calculate a displacement model of said object of interest from adjacent images of a set of pre-acquired images of said object of interest, said displacement model being periodical and reflecting the position of said object of interest along the time, characterize in that said processor is further configured to:

determine a first sub-set of images from said set of pre-acquired images within one periodical time cycle of said set of pre-acquired images on the basis of the displacement model;

identify a second sub-set of images from newly-acquired images, wherein images in said second sub-set of images are consecutive and have the same most similar image in said first sub-set of images, wherein a set of similarity levels is determined by comparing a given image in said newly acquired images with each image of said first sub-set of images, and wherein said most similar image has the largest similarity level in said set of similarity levels;

select a given image in said second sub-set of images as a first reference image;

identify a third sub-set of images from said newly-acquired images, wherein images in said third sub-set of images are consecutive and have the same most similar image in said first sub-set of images, wherein a set of similarity levels is determined by comparing a given image in said newly acquired images with each image of said first sub-set of images wherein said most similar image has the largest similarity level in said set of similarity levels, and wherein the same most similar image which the images in the third sub-set of images have is different from the same most similar image which the images in the second sub-set of images have;

select a given image in said third sub-set of images as a second reference image; and calculate the displacement between said second reference image and said first reference image.

12. A system as claimed in claim 11, adapted to connect to an image acquisition module for acquiring images of said object of interest.

13. A system as claimed in claim 12, wherein said image acquisition module is an ultrasound imaging acquisition module.

14. A system as claimed in claim 11, adapted to connect to a control module of a radiation therapy equipment, and to send the calculated displacement to the control module.

* * * * *